United States Patent [19]

Cosyns et al.

[11] 3,954,601

[45] May 4, 1976

[54] PROCESS FOR HYDROGENATING AROMATIC HYDROCARBONS ON SULFUR RESISTANT CATALYSTS

[75] Inventors: Jean Cosyns, Nanterre; Germain Martino, Poissy; Jean-Francois Le Page, Rueil-Malmaison, all of France

[73] Assignee: Institut Francais du Petrole, Rueil-Malmaison, France

[22] Filed: Aug. 7, 1974

[21] Appl. No.: 495,428

[30] Foreign Application Priority Data

Aug. 16, 1973 France............................. 73.29940

[52] U.S. Cl................................. 208/143; 208/27; 252/442; 252/466 PT; 260/667
[51] Int. Cl.².......................................... C10G 23/04
[58] Field of Search...................... 208/144, 143, 27; 260/667

[56] References Cited

UNITED STATES PATENTS

| 3,269,939 | 8/1966 | Marechol et al................... 208/144 |
| 3,412,174 | 11/1968 | Kroll................................. 260/667 |
| 3,536,632 | 10/1970 | Kroll................................. 252/430 |
| 3,770,844 | 11/1973 | Mertzweiller et al.............. 208/143 |

*Primary Examiner*—Herbert Levine
*Attorney, Agent, or Firm*—Millen, Raptes & White

[57] ABSTRACT

Aromatic hydrocarbons are hydrogenated in the presence of a catalyst obtained by admixing an aluminous carrier with a group VIII noble metal compound and a reducing agent of the formula Al $X_y$ $R_{3-y}$ where $y$ is 1, 3/2 or 2, X is halogen and R is a monovalent hydrocarbon radical.

15 Claims, No Drawings

PROCESS FOR HYDROGENATING AROMATIC HYDROCARBONS ON SULFUR RESISTANT CATALYSTS

This invention concerns a process for hydrogenating aromatic hydrocarbons, such as benzene, alkylbenzenes, polycyclic aromatic hydrocarbons and polycyclic alkylaromatic hydrocarbons, used as such or diluted in various hydrocarbon fractions, in the presence of sulfur resistant catalysts. These catalysts are formed by combining a noble metal of group VIII, a halogen, such as fluorine or chlorine, and an alumina carrier.

A first important application of the invention consists of hydrogenating the aromatic hydrocarbons of certain oil fractions, for example white-spirits broadly used in various industries, such as those producing paints, rubbers and solvents for agriculture.

A second important application concerns the hydrogenation of the aromatic hydrocarbons contained in kerosenes utilized as fuels, in order to improve their "smoke point". This empirical "smoke point" index is proportional to the hydrogen/carbon ratio of the considered hydrocarbon or oil fraction. To this ratio is directly linked the heat of combustion which is proportional to the extent of dehydrogenation of the aromatics. This quality is particularly desired for fuels such as jet fuels whose demand is always increasing and whose specifications concerning the maximal aromatic content may well be more severe with the advent of supersonic transport.

The presently known processes divide into three categories, each of which having a number of disadvantages.

The first category of processes makes use of hydrotreatment catalysts, which comprise non-noble metals of group VIII associated with metals of group VI A working in the sulfurized state. These catalysts result both in the hydrodesulfurization of the feed charge and in a limited hydrogenation of the aromatics. However, in spite of using high pressures and temperatures, for example 400°C and 80 kg/cm², the residual aromatic content is fairly high so that sufficiently dearomatized solvents cannot be obtained. The high aromatic content of the treated material is due to the fact that the hydrogenation is thermodynamically impaired by a temperature increase. When using this type of catalyst of low activity, the excessively high operating temperature may be compensated by a thermodynamically favorable pressure increase, which quickly attains a level at which the process is uneconomical and thus unsuitable for producing highly dearomatized fractions. Moreover, these treatments result in some hydrocracking which necessitates subsequent separation treatments.

The second catagory of processes makes use of catalysts consisting of group VIII metals in the metallic state. The nickel catalysts and the noble metal catalysts, such as the platinum catalysts, belong to this category. All these catalysts have the disadvantage of deactivating in the presence of the sulfur compounds naturally present in the oil cuts, so that the feedstock must be previously desulfurized to such a degree as to provide a sulfur content usually lower than 10 ppm by weight.

Some processes, for example that described in U.S. Pat. No. 3,269,939, claim the possibility of using charges containing up to 300 ppm by weight of sulfur, by using, among others, platinum on alumina-silica. This carrier, although providing the catalyst with a substantial resistance to sulfur, gives rise to cracking which is quite detrimental to the yield of the operation.

A third category of processes makes use of mono- or poly-metallic catalysts containing at least one noble metal, such as platinum, and halogen, such as fluorine or chlorine, on an alumina carrier. These catalysts are not sulfur resistant, as a rule, and the accepted sulfur amounts are usually lower than 20 ppm by weight. More recently the use of sulfur withstanding catalysts containing 10–35% of fluorine has been proposed, but, as shown hereinafter, such contents result in severe cracking of such charges as white-spirits and kerosene.

A third application of the invention consists of hydrogenating aromatics contained in hydrocarbon oils or paraffins in view of obtaining white oils and paraffins. As regards this third application, the hydrogenation treatment of the invention advantageously replaces the conventional treatments, i.e. refining with oil or activated earth, as well as the multi-step hydrotreatments, for example hydrodesulfurization followed with hydrogenation. With respect to white oils, the process of the invention, as compared with conventional treatments with oleum and activated earth, provides products with increased yields, usually higher than 98% by weight with respect to the charge, while with the oleum treatment the yields are at most 70% with respect to the charge. Moreover, the present process does not produce useless residues: acid tars and used filtration earths.

The invention discloses the manufacture of both sulfur resistant and non-cracking catalysts which are useful for hydrogenating aromatic hydrocarbons, said manufacture comprising admixing an aluminous carrier with a compound of a group VIII noble metal and an organmetallic compound of the formula $Al\ X_y\ R_{3-y}$ where $y$ may be 1, 3/2 or 2, X is a halogen atom such as F or Cl and R is a monovalent hydrocarbon radical.

Although the order of introduction of the catalyst components may be selected at will, we prefer to impregnate alumina by means of a solution obtained by admixing a compound of a group VIII noble metal with a reducing agent, such as hereinbefore defined, in an organic solvent.

The admixing of the catalyst constituents may be carried out at, for example, 0°–250°C, although the best catalysts are obtained at 100°–220°C. The impregnation of alumina may also be carried out at, for example, 0°–250°C, and preferably 100°–220°C.

The aluminous carrier may contain small amounts of other materials usually present in the catalyst carriers, for example silica.

The preferred carrier is alumina of specific surface in the range of 50–500 m²/g. Its total pore volume is preferably 0.1–1 cm³/g. The noble metals may be, for example, Pt, Ir, Rh or Ru, and preferably Pt and/or Ir in the form of salts or complexes soluble in organic solvents. For example, we can use salts, such as halides, alcoholates, acetylacetonates or carboxylates, or complexes, for example complexes with carbon monoxide or ammonia.

As organic solvents, we may use hydrocarbons, preferably saturated hydrocarbons and, in some cases, ethers or nitriles.

The noble metal content is 0.05–3% by weight and preferably 0.1–1% by weight with respect to the carrier.

The reducing agent may be a hydrocarbyl aluminum fluoride or chloride, being either a well-defined compound or a mixture of several compounds, for example ethyl aluminum sesquichloride of the formula $Al_2Cl_3(C_2H_5)_3$ or $Al\ Cl_{3/2}\ (C_2H_5)_{3/2}$.

We can use, for example, diethyl aluminum monochloride, isobutyl aluminum dichloride, dibenzylaluminum monofluoride, n-dodecyl aluminum difluoride, diphenylaluminum monochloride and cyclohexylaluminum difluoride.

The preferred atomic ratio of the noble metal to aluminum is 0.5–20. The amount of halogen introduced into the catalyst may be, for example, 0.5–15% and preferably 1–5%.

When carrying out the impregnation, we preferably use the catalyst solution at a concentration of from $10^{-1}$ to $10^{-6}$ gram-atoms of noble metal per liter, so as to obtain a uniform impregnation of the carrier. Highly diluted solutions are preferred, the preferred concentrations being from $10^{-3}$ to $10^{-5}$ gram-atom of noble metal per liter.

A selected amount of the carrier is impregnated with this diluted solution, according to the dry or wet technique, or by circulating the solution through the carrier arranged as a fixed bed in the reactor. The latter technique has various advantages:

it permits synthesizing the catalyst in the unit, thus avoiding any handling of pyrophoric solids,
it permits using a minimal amount of solvent, irrespective of the amount of metal to be composited with the carrier, by continuously recycling the impregnation solvent.

The circulation rate is also of major importance: too slow a rate results in preferential absorption at the inlet of the carrier bed, which would be detrimental to the further use thereof. The velocities depend essentially on the nature of the carrier: satisfactory impregnations are usually obtained at hourly flow rates of 5–500 liters of solution per kg of carrier.

Another important point is the impregnation temperature: it has been observed that impregnations carried out at room temperature resulted in catalysts of low activity. The temperatures are thus advantageously above 100°C and preferably from 100° to 250°C.

The material to be hydrogenated may be a pure aromatic hydrocarbon or an oil fraction, such as a light solvent (boiling in the range of from 40° to 150°C), white spirits, kerosene or light gas oil whose final point may be 300°C. The sulfur content, in the form of sulfur compounds, of these charges may be as high as 3000 ppm by weight, for example 300 to 3000 ppm.

With respect to the production of white oils, the charge may be a raw oil from the conventional process for producing lubricating oils after solvent extraction of the aromatics and dewaxing, or from other processes for converting hydrocarbons, for example hydrorefining or hydrocracking of hydrocarbon oils; these raw oils consist essentially of naphthenic and/or paraffinic hydrocarbons comprising from 20 to 30 carbon atoms, as an average; they contain, for example, from 0.5 to 10% by weight of aromatic hydrocarbons, their density at 20°C is from 0.800 to 0.900, their viscosity at 37.8°C from 30 to 80 cst as an average and their sulfur content depends on the origin of the oil and is usually from 10 to 3000 ppm by weight; finally, the ASTM color of these charges is usually about 1 to 2.

The charges utilized for producing white paraffin waxes are paraffins and waxes from solvent dewaxing units; these paraffin fractions which essentially comprise paraffinic hydrocarbons have an average molecular weight of from 400 to 800; they contain usually from 0.5 to 5% by weight of aromatic hydrocarbons; their melting point may range from 50° to 80°C, their oil content is normally lower than 3% by weight and their sulfur content may be as high as 0.5% by weight. Intermediate fractions, for example soft paraffins, may also be treated.

The operating conditions vary according to the nature of the charge, i.e. the nature of the aromatic hydrocarbon to be hydrogenated and the sulfur content.

The usual conditions are the following:
Temperature: about 200° to 350°C
Pressure: 5 to 100 kg/cm$^2$
Ratio H$_2$/charge: 100 to 1500 liters/liter TPN
Space velocity VVH = 0.5–10 liters/hour/liter of catalyst.

The following examples are given for illustration, not limitation.

EXAMPLE 1

We have prepared several catalysts containing platinum and halogen on alumina, first according to the conventional method and then according to the technique of the patent.

The carrier is transition alumina of the cubic gamma type of a specific surface of 200 m$^2$/g in the form of small balls of 1.5–2.5 mm diameter.

A first catalyst (C$_1$Cl) is prepared by impregnating alumina by means of a diluted aqueous solution of hexachloroplatinic acid and hydrochloric acid at concentrations of 0.6 part by weight of platinum and 2 parts by weight of chlorine per 100 parts by weight of dry alumina. Alumina is maintained unmoved in the impregnation solution until all Pt and Cl have been absorbed. The catalyst is then dried at 120°C, then calcined at 530°C under air for 2 hours. It contains about 0.6% by weight of Pt and 2% by weight of chlorine.

A second catalyst (C$_2$F) is prepared in the same way as C$_1$Cl and with the same Pt content, except that we have used hydrofluoric acid, instead of HCl, so as to introduce about 0.6% by weight of platinum and 1.5% by weight of fluorine into the catalyst.

A third catalyst (C$_3$AlCl) is prepared as follows:

10 g of the same alumina carrier, previously calcined at 500°C for 2 hours, is introduced directly into the tubular reactor where the reaction will take place. Then the temperature is lowered to 120°C and 200 cc of a toluenic solution of the product obtained by reacting 0.31 mmole of platinum acetylacetonate with 0.93 mmole of ethyl aluminum sesquichloride is injected under a hydrogen pressure of 3 bars and at a V.V.H. of 10.

The so prepared catalyst is ready for use in hydrogenation. It contains about 0.6% by weight of platinum and about 2% by weight of chlorine like catalyst (C$_1$Cl).

A fourth catalyst (C$_4$Al F) is prepared in the same manner as C$_3$Al Cl, by replacing ethylaluminum sesquichloride with ethylaluminum fluoride of the formula AlF (C$_2$H$_5$)$_2$. It contains about 0.6% by weight of platinum and about 1.5% by weight of fluorine like catalyst (C$_2$F).

These four catalysts are then tested in the following manner: The material to be hydrogenated consists of a petroleum fraction of the white spirit type having the following characteristics:
ASTM distillation range: 152°–200°C
Density at 15°C: 0.778
Aromatic hydrocarbons: 15% by weight
Sulfur (in the form of sulfur compounds): 400 ppm by weight.

The four catalysts are pretreated at 350°C for 15 hours with a hydrogen stream at 1 atmosphere.
The hydrogenation is carried out as follows:
Total pressure: 45 kg/cm$^2$
Space velocity: 4
Temperature: 300°C
H$_2$ gas/liquid charge: 380 liters/liter TPN
The results are summarized in table I.

TABLE I

| Catalyst | % b.w. of aromatic hydrocarbons in the product after: | | | | |
|---|---|---|---|---|---|
| | 2 h | 10 h | 50 h | 100 h | 200 h |
| C$_1$ Cl | 0.3 | 11.5 | 15 | — | — |
| C$_2$ F | 0.4 | 12.0 | 15 | — | — |
| C$_3$ Al Cl | 0.5 | 0.6 | 0.9 | 1.1 | 1.0 |
| C$_4$ Al F | 0.5 | 0.5 | 0.8 | 0.9 | 0.9 |

The sulfur content of the hydrogenated material is always lower than 5 ppm by weight.

This table shows that, under selected conditions, the catalysts prepared according to conventional techniques, although very active in the first hours of run, quickly deactivate to give no more conversion after 50 hours. On the contrary, the catalysts prepared according to the process of the patent, retain a high activity all along the test.

EXAMPLE 2

This example concerns the treatment of the same white-spirit cut as in example 1, but an additional amount of sulfur compound (dibenzothiophene) has been used, so as to have 1500 ppm by weight of sulfur.
The hydrogenation is carried out as follows:
Total pressure: 55 kg/cm$^2$
Space velocity: 1
Temperature: 320°C
H$_2$/charge: 1,000 liters/liter TPN
The results obtained with the catalysts prepared according to the invention are summarized in table II.

TABLE II

| Catalyst | % b.w. of aromatic hydrocarbons in the product after: | | | | |
|---|---|---|---|---|---|
| | 2 h | 10 h | 50 h | 100 h | 200 h |
| C$_3$ Al Cl | 0.6 | 0.7 | 1.1 | 1.2 | 1.1 |
| C$_4$ Al F | 0.5 | 0.7 | 1.1 | 1.0 | 1.1 |

The sulfur content of the hydrogenated material is always lower than 15 ppm by weight. It is clear that the catalysts prepared according to the technique of the invention have a high activity, even at particularly high sulfur contents.

EXAMPLE 3

A catalyst is prepared in the same way as C$_3$Al Cl except that, instead of ethylaluminum sesquichloride, triethylaluminum has been used in a ratio Al/Pt of 6, just as in example 1.
The feed charge and the conditions are the same as in example 1. We have found that the so prepared catalyst, although very active initially, has completely lost its hydrogenating activity after only 5 hours.

This unexpected fact shows that very active catalysts, as prepared according to conventional techniques of the homogenous catalysis, i.e. by using organometallic reducing agents, are not sulfur resistant. A hydrogenation catalyst which retains its activity in the presence of large amounts of sulfur compounds can be obtained only by using fluorine or chlorine containing catalysts in the manner described in the present patent.

EXAMPLE 4

A new catalyst is prepared from catalyst C$_2$F of example 1 by impregnation thereof with a hydrofluoric acid solution, so as to obtain a catalyst having a fluorine content of 13% by weight. The catalyst is then dried and calcined as in example 1.
The catalyst of increased fluorine content is pretreated in situ with hydrogen, as described in example 1.
The hydrogenation feedstock is the same as in example 1 (sulfur content: 400 ppm), as well as the operating conditions. The performances and the yield by weight of hydrogenated material boiling in the range of 150°–200°C are given in the following table. By way of comparison, the corresponding values for catalyst C$_4$Al F are given in the same table.

TABLE III

| Hours of run | Catalyst containing 13 % F | | C$_4$ Al F | |
|---|---|---|---|---|
| | % aromatics in the product | yield by % | % aromatics in the product | yield by % |
| 5 | 0.5 | 93.2 | 0.5 | 99.85 |
| 10 | 3.1 | 94.3 | 0.5 | 99.92 |
| 50 | 4.7 | 94.9 | 0.8 | 99.98 |
| 100 | 4.9 | 94.7 | 0.9 | 99.99 |
| 200 | 4.8 | 95.1 | 0.9 | 99.98 |

It can be seen that the catalyst of high fluorine content is not so active as the catalyst of the invention. It is observed that the catalyst C$_4$ Al F gives no measurable cracking, while that containing 13% of fluorine gives about 5% by weight of mainly gaseous products without value.

EXAMPLE 5

A catalyst containing 0.6% of iridium and 2% by weight of fluorine is prepared according to the technique used for catalyst C$_4$Al F, except that platinum acetylacetonate has been replaced by iridium acetylacetonate. The results obtained by hydrogenating the feedstock of example 1 containing 400 ppm of sulfur, in the same conditions as described in example 1, are summarized in table IV.

TABLE IV

| Hours of run | % aromatics in the product |
|---|---|
| 5 | 0.5 |
| 10 | 0.6 |
| 50 | 0.9 |
| 100 | 1.1 |
| 200 | 1.0 |

The sulfur content of the hydrogenated product is always lower than 4 ppm by weight. It is clear that this catalyst prepared according to the invention has a high activity in the presence of sulfur compounds.

EXAMPLE 6

This example relates to the treatment of jet kerosene whose smoke point must be improved by reduction of the aromatic content.

The properties of this kerosene are the following:
$d_4^{15}$: 0.821
sulfur (ppm by weight): 329 in the form of sulfur compounds;
aromatics: 19% by volume (AFNOR MO 7024);
smoke point: 18 mm (AFNOR MO 7028);

| distillation ASTM: | initial point | : | 164°C |
|---|---|---|---|
| | 50 % | : | 204.5°C |
| | final point | : | 244.5°C |

A product having a smoke point of more than 23 mm is desired, which corresponds roughly to an aromatic hydrocarbon content lower than 10 ppm by volume.

The operating conditions are the following:
total pressure: 50 kg/cm$^2$
temperature: 300°C
H$_2$/charge: 350 liters per liter TPN
pph: 4 kg of charge per kg of catalyst and per hour The catalyst is C$_4$Al F of example 1. The results are summarized in the following table:

TABLE V

| Time in hours | 50 | 100 | 500 | 1000 | 2000 |
|---|---|---|---|---|---|
| Smoke point mm. | 28.5 | 27 | 26.5 | 26.5 | 26.5 |
| % by volume of residual aromatics | 2.2 | 4.1 | 4.8 | 4.9 | 4.8 |
| S content (ppm by weight) | 3 | 2.5 | 3 | 2.5 | 3 |
| yield % b.w. | — | 99.95 (1) | — | — | 99.98 (2) |

(1) Average over 100 hours
(2) Average over 2000 hours.

This shows that the catalyst according to the invention gives, even after a very long time, a high grade kerosene whose aromatic content is substantially lower than the specification, and this with a yield which is close to the theoretical yield.

EXAMPLE 7

Production of white oil

The feedstock is an oil having the following main properties:
$d_4^{20}$: 0.856
sulfur: 300 ppm by weight
ASTM color: 1.5
Saybolt color: <— 16
viscosity at 37.8°C: 32.55 cst
viscosity index: 98.5
Aniline point °C: 107
Aromatics, % by weight: 2.8
Average molecular weight: 420
Pour point: − 15°C The catalyst is C$_3$Al Cl of example 1 and the operating conditions are:
Total pressure: 80 kg/cm$^2$
Temperature: 340°C
Space velocity: 1 m$^3$ of charge per 1 m$^3$ of catalyst per hour
H$_2$/charge: 1,000 liters per liter (TPN)

After 1000 hours of run, white oil is obtained with a yield of 98.5% by weight with respect to the charge; it has the following characteristics:
$d_4^{20}$: 0.850
sulfur: < 10 ppm by weight
Saybolt color: +30
Viscosity at 37.8°C: 20.67 cst
Viscosity index: 106
Aniline point °C: 108
Aromatics % by weight ≤ 0.5

| U.V. absorption (ASTM 2008) | |
|---|---|
| 250–295 nm (m$\mu$) | 0.049 |
| 295–300 nm (m$\mu$) | 0.016 |
| 300–400 nm (m $\mu$) | 0.014 |

EXAMPLE 8

Production of white paraffin wax

The charge of this example is a paraffin wax having the following main properites:
$d_4^{80}$: 0.785
Sulfur: 300 ppm by weight
ASTM color: 0.5
Melting point: 63.9°C
Oil content: 0.7% by weight
Aromatics: 1% by weight
Carbon forming material > 16 (ASTM D565)
Needle penetration at 25°C: 19 mm The catalyst is C$_4$Al F of example 1 with the following operating conditions:
Total pressure: 25 kg/cm$^2$
Temperature: 280°C
Space velocity: 2 m$^3$ of charge per 1 m$^3$ of catalyst per hour
H$_2$/charge: 500 liters/liter (TPN)

After 1000 hours of run, white paraffin is obtained with a yield of 99.1% by weight. It has the following main characteristics:
$d_4^{80}$: 0.783
Sulfur <10 ppm by weight
Saybolt color: +30
Melting point: 63.8°C
Oil content: 0.8% by weight
Aromatics <0.01% by weight
Carbon forming material 1 (CODEX specification <4)
Needle penetration at 25°C: 21 mm

| U.V. absorption (ASTM 2008) | |
|---|---|
| 280–289 nm | 0.0012 |
| 290–299 nm | 0.0004 |
| 300–359 nm | 0.0003 |

-continued

U.V. absorption (ASTM 2008)

| 360–400 nm | 0 |
|---|---|

What we claim is:

1. In a process for hydrogenating an aromatic hydrocarbon containing sulfur compounds as impurities, wherein said aromatic hydrocarbon and hydrogen and contacted with a catalyst consisting essentially of (a) a noble metal selected from the group consisting of platinum, iridium, rhodium and ruthenium, (b) an alumina carrier, and (c) fluorine or chlorine, wherein the improvement comprises using as said catalyst a catalyst manufactured by a process comprising the essential steps of (1) reacting a compound of a noble metal selected from the group consisting of platinum, iridium, rhodium and ruthenium with a reducing agent of the formula Al Xy R$_{3-y}$, wherein y is 1, 1.5 or 2, X is fluorine or chlorine and R is a monovalent hydrocarbon radical, in an organic solvent, the atomic ratio of the noble metal to the aluminum being from 0.5 to 20, thereby producing a catalyst solution, impregnating an alumina carrier with said catalyst solution in a sufficient amount to provide the catalyst with 0.05–3% by weight of said noble metal based on the carrier, and 0.5–15% by weight of chlorine or fluorine, whereby said catalyst is resistant to sulfur poisoning as compared to a catalyst having no chlorine or fluorine.

2. A process according to claim 1, wherein the aromatic hydrocarbon is in the form of a hydrocarbon fraction containing aromatic hydrocarbon, saturated hydrocarbon and from 300 to 3,000 ppm by weight of sulfur.

3. A process according to claim 2, wherein the catalyst is formed, and the impregnation is carried out at a temperature of at least 100°C.

4. A process according to claim 1, wherein the noble metal is platinum.

5. A process according to claim 1, wherein the aromatic hydrocarbon is benzene.

6. A process according to claim 1, wherein the material subjected to hydrogenation is a hydrocarbon oil or a paraffin wax.

7. A process according to claim 6, wherein the hydrocarbon oil is a hydrocarbon fraction having a density of 0.8 to 0.9 to 20°C.

8. A process according to claim 6, wherein the paraffin wax is a fraction of essentially paraffinic hydrocarbons having an average molecular weight of from 400 to 800.

9. A process according to claim 1, wherein said impregnating is conducted at 100°–250°C.

10. A process according to claim 1, wherein said alumina has a specific surface of 50–500 m$^2$/g and a pore volume of 0.1–1 cm$^3$/g.

11. A process according to claim 1, wherein the catalyst contains 0.1–1% by weight of said noble metal based on the carrier.

12. A process according to claim 1, wherein the content of chlorine or fluorine in the catalyst is 1–5% by weight.

13. A process according to claim 11, wherein the content of chlorine or fluorine in the catalyst is 1–5% by weight.

14. A process according to claim 13, wherein said alumina has a specific surface of 50–500 m$^2$/g and a pore volume of 0.1–1 cm$^3$/g.

15. A process according to claim 14, wherein said impregnating is conducted at 100°–250°C.

* * * * *